Figure 1:
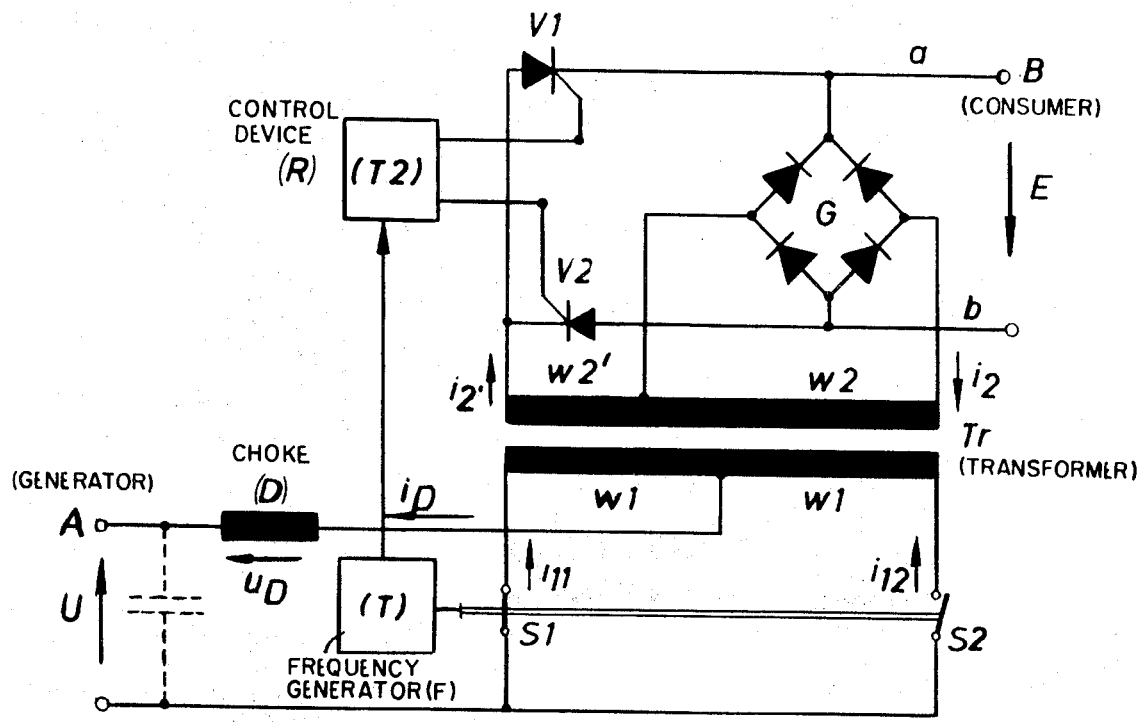

United States Patent

[11] 3,622,866

| [72] | Inventor | Andreas Boehringer |
| | | Friedrichshafen, Germany |
| [21] | Appl. No. | 860,576 |
| [22] | Filed | Sept. 24, 1969 |
| [45] | Patented | Nov. 23, 1971 |
| [73] | Assignee | Dornier System GmbH |
| | | Friedrichshafen, Germany |
| [32] | Priority | Oct. 22, 1968 |
| [33] | | Germany |
| [31] | | P 18 04 430.9 |

[54] DIRECT CURRENT CONVERTER WITH A VARIABLE TRANSFORMATION RATIO
6 Claims, 13 Drawing Figs.

[52] U.S. Cl........................................ 323/17,
321/2, 321/43, 323/22 SC, 323/24
[51] Int. Cl........................................ H02m 3/32
[50] Field of Search........................................ 321/2, 43,
45; 323/17, 22 SC, 24, 48

[56] References Cited
UNITED STATES PATENTS

| 3,195,036 | 7/1965 | McNulty et al............... | 323/22 UX |
| 3,248,634 | 4/1966 | Fudaley et al................ | 321/2 |
| 3,305,757 | 2/1967 | Schlabach et al............. | 321/45 X |
| 3,331,008 | 7/1967 | Bedford........................ | 321/2 |
| 3,402,342 | 9/1968 | Wagner......................... | 321/2 X |
| 3,496,444 | 2/1970 | King et al..................... | 321/2 |

Primary Examiner—A. D. Pellinen
Attorney—Kenyon & Kenyon Reilly Carr & Chapin

ABSTRACT: A converter circuit is provided with a transformer with a primary coil to which direct current is applied in one of two opposite directions and a secondary coil which is connected to a supplementary winding. The supplementary winding connects over a rectifier tube to each of the supply lines of the consumer. The tubes are regulated so as to be conductive or nonconductive depending upon the switching over of the primary current flow. This controls the transformation ratio.

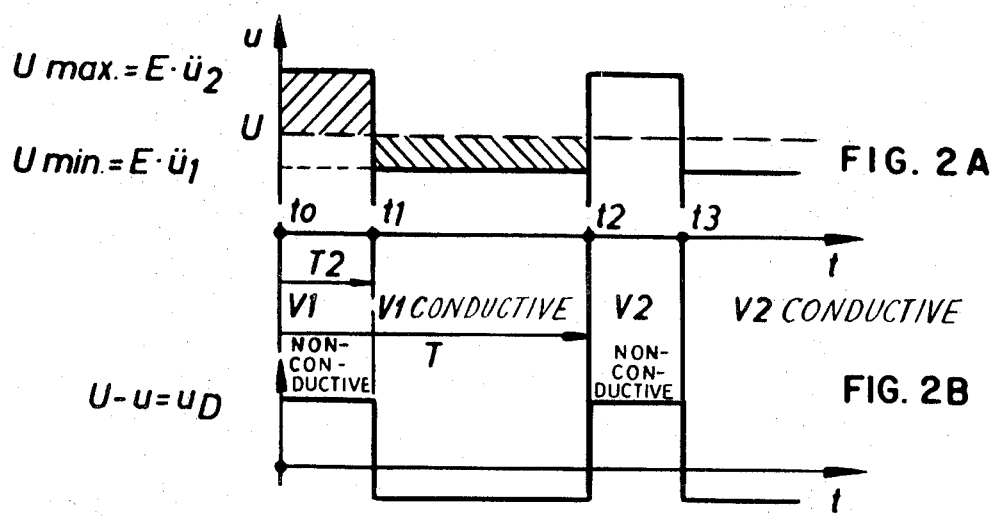
FIG. 2A
FIG. 2B
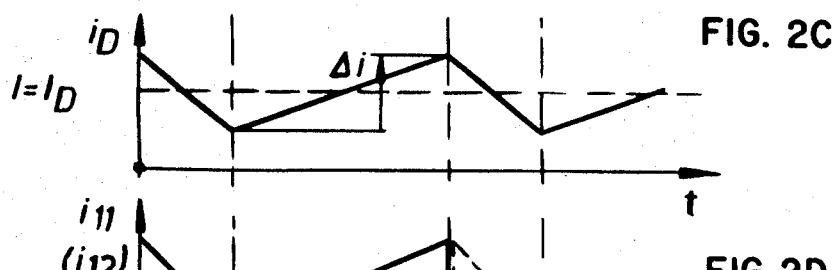
FIG. 2C
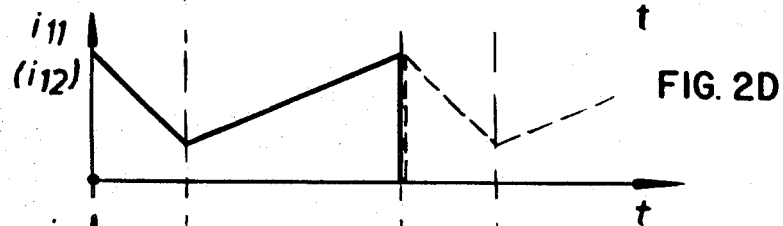
FIG. 2D
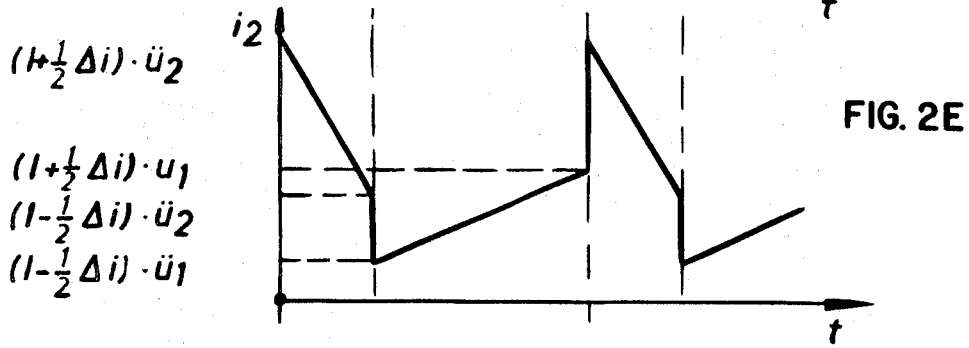
FIG. 2E
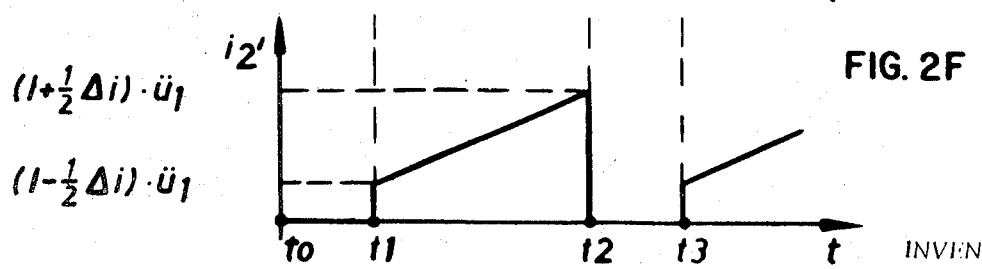
FIG. 2F

DIRECT CURRENT CONVERTER WITH A VARIABLE TRANSFORMATION RATIO

The invention relates to a direct current converter with a variable transformation ratio.

In many instances, direct current converters with a variable transformation ratio have been required such as where a direct current voltage from a generator is subjected to variable fluctuations during operation and requires adaptation to a constant consumer voltage. However, since direct current cannot be directly transformed upwardly, a transformation must first occur. In order to carry out such transformations, motor generator systems, for example, have frequently been used. Generally, these motor generator systems have in practice only been advantageously used in the case of high power and have not been practical in the case of lower electrical power. Further, these systems have been relatively heavy and bulky and have required continuous maintenance.

Other techniques of carrying out a transformation have included the use of methods in which the primary current is first chopped, then transformed up similarly to alternating current and finally rectified. However, the converters which have utilized such techniques have not been able to alter the transformation ratio in a simple manner.

Heretofore, it has been known to utilize a direct current converter known as a one-winding blocking transducer. The type of converter functions so that the direct current energy can be transformed to another voltage and uses a choke which becomes charged with magnetic energy from a generator. Here, through the change over, it is ensured that the choke delivers its stored energy at another voltage to a consumer. The choke has therefore been installed longitudinally or transversely between the conductors of the connecting line between the generator and the consumer. In both cases, two switches are needed in order to alternately unblock or block the flow of current to and from the choke. In a further development of this circuitry, the switch forming the connection between the choke and the consumer can also be replaced by a diode. This latter arrangement has the advantages of simple construction, and of not requiring the primary current to be completely interrupted, i.e. so as to periodically become zero. However, the chief drawback of the one-winding blocking transducer is that no potential separation between the primary side and the secondary side is possible with the result that it has only a limited transformation ratio. In addition, there are difficulties in the way of making the transformation ratio very great, for example, 1:20 and more.

A potential separation is obtained only in the so-called two-windings blocking transducer. This, however, in its turn, has the drawback that at each switching the primary current becomes completely interrupted for a certain time. Such an interruption of current is, however, in many cases not desired in principle, or because of its resultant harmonic content, for example, in the case of energy supplying equipment installed in a satellite with which solar cells are used as a generator. This example shows with particular clarity the difficulties and requirements made of direct current converter. That is, in comparison with the available powers, the primary voltages are small and very greatly greatly depending on the satellite's position at the moment and its distance from the sun. Moreover, as has already been mentioned, the direct current at the primary side should not, if possible, become interrupted, and should in general have but a small harmonic content. Also, the transformation ratio of the direct current transmitter must be selectable as desired and be easily adaptable to the variations of the generator. This is necessary so that the consumer at the secondary side may always receive a constant voltage, and, with employment of a self-regulating control of the performance, the maximum possible power in each case. Last but not least, there is also the important requirement that in the case of a satellite the direct current converter shall not be a heavy and expensive item.

A two-windings blocking transducer, however, cannot fulfill all these requirements. Instead, the requirements correspond to those for the so-called flow-through transducer in which the flow of energy from the generator to the consumer is never interrupted. The essential constituent of such a transducer is a transformer to which the primary direct current voltage is applied alternately in a different direction. This is advantageously done symmetrically of a middle tap of the primary winding while the alternating voltage appearing at the secondary side is rectified and fed to the consumer. Alteration or control of the transformation ratio is possible when all the rectifier tubes at the secondary side are controllable, or when a pulse-width modulation is effected at the primary side. These two solutions however bring with them a high harmonic content of the primary current, and in the case of the second named solution particular stressing of the primary tubes.

Accordingly, it is an object of the invention to provide a direct current converter having a variable transformation ratio which is easily and simply controlled.

It is another object of the invention to provide a direct current converter which is capable of use with high or low electrical power.

It is another object of the invention to provide a direct current converter which is capable of producing a potential separation between a primary and a secondary side thereof.

It is another object of the invention to provide a direct current converter capable of high transformation ratios.

It is another object of the invention to provide a direct current converter which is of relatively small weight and bulk and is relatively inexpensive.

It is another object of the invention to provide a direct current converter which has an adjustable transformation ratio adaptable to the variations of a generator connected thereto.

Briefly, the invention provides a direct current converter which includes a transformer whose primary winding is flowed through by direct current alternately in the one and the other directions, with a rectification being effected at its secondary side. The secondary winding of the transformer is connected to at least one supplementary winding and a controllable tube is inserted in each of the lines leading from the supplementary winding end to the consumer. Further, the switch-on instant of each controllable tube is adjustable relative to the switchover instant of the primary current, for the purpose of controlling the transformation ratio. The switch-on instant for the controllable tubes can also be set to have an adjustable time lag relative to the primary switchover times. The switches at the primary side can be of a mechanical type, or else they may be made as electronic switches.

In accordance with a further embodiment of the invention, the secondary winding of the transformer may have at one side a supplementary winding, from which two controllable tubes of opposite polarity lead to the consumer terminals which are fed from the rectifier hookup. In one variant of the invention, the secondary winding is provided with a middle tap to which a consumer line is connected. In addition, a supplementary winding is connected at each of the ends of the secondary winding and a line extends from each of the common connection points of the secondary winding and supplementary windings to the other consumer terminal. In addition, a noncontrollable tube is inserted in each line connected to the common connection point and a line from each free end of the supplementary windings in which a controllable valve is inserted leads to the same consumer terminal.

Because a higher voltage appears at the secondary side than at the primary side, thyristors can be used because their threshold voltage at the high voltage side is not so important as it would be at the low voltage side. The control of the transformation ratio is achieved in that the switch-on instant for the controllable tubes at the secondary side is shifted relative to the switchover point of the switches at the primary side. This can be done in different ways, for example, the switchover at the primary side can occur at a constant frequency while the switching instants at the secondary side have an adjustable time delay relative to the switching instants at the primary side. Another possibility consists in establishing a definite time delay for the switching instants of the controllable tubes at the secondary side and to make up for this in effecting the switchover processes at the primary side with variable frequency. In both cases, the relationship between the length of the cycles at the primary side and the time delay at the secondary side becomes varied. This relationship determines the transformation ratio.

The direct current converter made in accordance with the invention and having a tapped secondary winding provide perfect potential separation between the primary side and the secondary side, and are characterized by only a small pulsation of the primary current as well as by low weight. In their construction they are very simple, and they operate reliably, so that they, in combination with a self-optimizing regulatory process, meet all the requirements set forth above.

Figure 3:
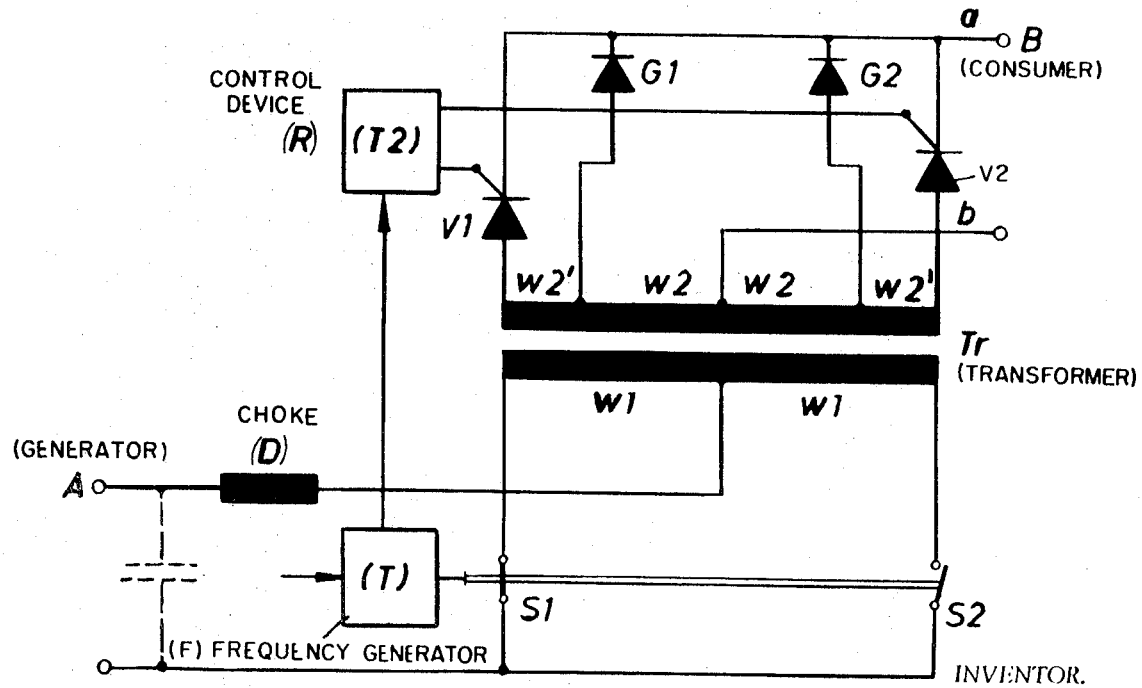
Figure 4A:
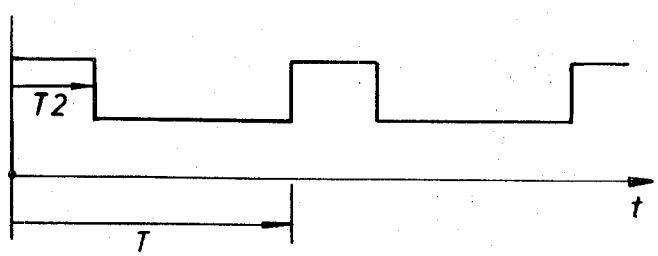
Figure 4B:
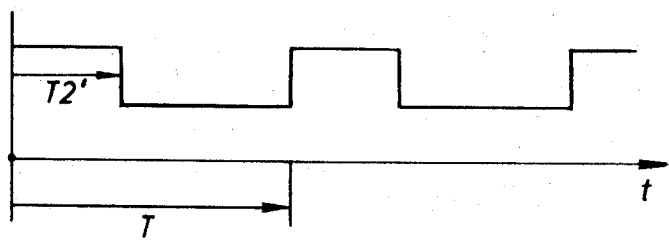
Figure 5A:
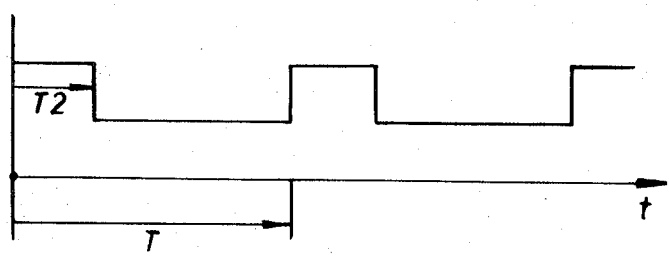
Figure 5B:
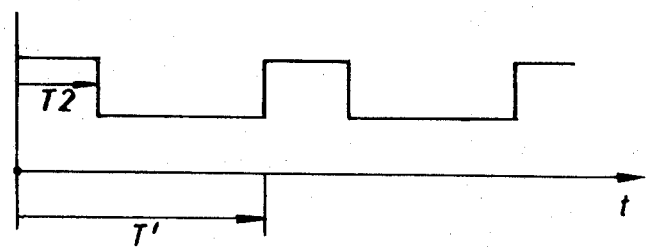
Figure 6:
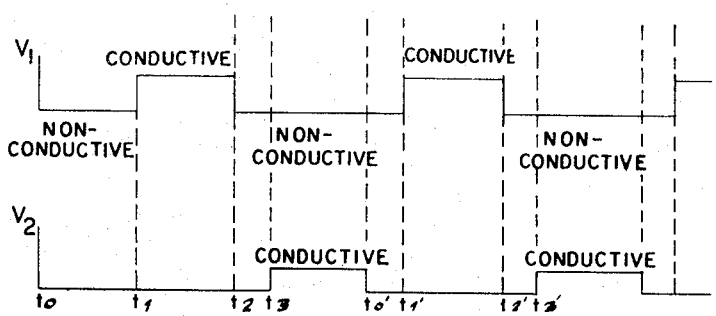

These and other objects and advantages of the invention will become more apparent from the following detailed description and appended claims taken in conjunction with the accompanying drawings in which:

FIG. 1 schematically illustrates the circuit of a direct current converter constructed in accordance with the invention;

FIGS. 2a to 2f each graphically illustrate the patterns of either the voltage or the current at various points in the converter circuit of FIG. 1;

FIG. 3 schematically illustrates a modified circuit of a direct current converter according to the invention;

FIGS. 4a and 4b graphically illustrate the patterns of actuation of the switchover points for the circuit of FIG. 1;

FIGS. 5a and 5b graphically illustrated the patterns of actuation of the switchover points for the circuit of FIG. 3; and FIG. 6 graphically illustrates the time cycle of FIG. 2a.

Referring to FIG. 1, the direct current converter has a circuit in which a transformer $T_r$ is interposed and which is connected to a generator A. The transformer $T_r$ has a primary side which is divided into two part-windings $w1$ and is connected via a line which extends from the common point of the part-windings $w1$ to one terminal of the generator A. In addition, the ends of the part-windings $w1$ are connected via lines to the other terminal of the generator A. Further switches S1, S2, respectively, are interposed in these latter lines between the part-windings $w1$ and the generator terminal. The switches S1, S2 are disposed in opposition to each other so that when one is closed, the other is open. Also, both switches S1, S2 are connected to a frequency generator F so as to be alternately opened and closed in dependence on the operation of the frequency generator F. The frequency generator F operates on a fixed frequency $f=1/T$ (where T is the duration of the cycle) so as to open and close the respective switchs, and thus can easily be constructed as an astable multivibrator. While the switchs S1, S2 can be contacts, as illustrated, they can also be electronic switches. Depending upon the position of the switches S1, S2 the voltage coming from the generator A is applied symmetrically in push-pull fashion to one or the other of the part-windings $w1$ via the common point of the part-windings.

The primary side of the circuit of the transmitter also includes a choke D, as is known, in the line between the generator terminal and the common point of the part-windings $w1$. The choke D serves to void current peaks and to compel a continuous flow of energy. Additional elements can also be connected in the primary side of the circuit, such as a smoothing condenser (as shown in dotted lines); however, as these elements are immaterial to the essence of the invention, such need not be further described.

The secondary side of the transmitter circuit includes a secondary winding of the transformer $T_r$ which is divided into two part-windings $w2$, $w2'$. One part-winding $w2$ is connected over a rectifying circuit G to a pair of supply lines, $a$, $b$ which connect to the terminals of a consumer B. A buffer battery (not shown) may also be connected between the supply lines and consumer. The supplementary part-winding $w2'$ is connected at one end in common with the other part-winding $w2$ and to the rectifying circuit G. The free end of the supplementary part-winding $w2'$, on the other hand, is connected to each of the supply lines $a$, $b$ over a controllable electronic tube V1, V2, respectively, of known construction such as a rectifier or a thyristor. The tubes V1, V2 are further connected to a control device R which serves to adjust the switching instants of the tubes. The control device R is also in communication with the frequency generator F on the primary side to receive the switchover instants for the primary current. The control device R can, for example, be constructed as monostable multivibrator which is triggered over an adjustable delay period by the frequency generator F.

Alternatively, it is possible to adjust the control device relative to a time delay T2 for the switching instant of the tubes V1, V2 relative to the switchover instant at the primary side. As previously mentioned, the relationship of the time delay T2 to the switching period T at the primary side is a measurement for the alteration of the transformer ratio.

Further, it is advantageous to use a fixed adjustment astable multivibrator for the frequency generator F in order to control the primary side switching processes. In the case, the switching state of the multivibrator is announced to the control device R.

Referring to FIGS. 1 and 2a to 2f, during operation, in the case where only one of the two controllable tubes V1, V2 is conductive:

$$U/E = w1/(w2+w2') = \ddot{u}_1$$

where where U is the voltage supplied by the generator, A, E is the voltage received by the consumer B, $w1$, $w2$, $w2'$ are the part-windings of the transformer $T_r$ and $\ddot{u}_1$ is the transformation ratio. However, in the case where the two tubes $V_1$, $V_2$ are nonconductive, the transformation ratio $\ddot{u}_2$ is expressed as follows $$w1/w2 = \ddot{u}_2, \text{ whereby } \ddot{u}_2 > \ddot{u}_1$$

Assuming that the voltage E at the secondary side is constant, for example, by means of a buffer battery (not shown), the switchover operations of the tubes V1, V2 react on the primary side so that the phenomena occurring thereat can now be considered.

Referring to FIGS. 2a and 6, with the switchover points being set for the time instants $t_0$ and $t_3$, the primary side varies as follows:

from $t_0$ to $t_1$; V1 and V2 nonconductive secondary: E; primary $u = E \cdot \ddot{u}_2$ $t_1$ to $t_2$; V1 conductive secondary: E; primary $u = E \cdot \ddot{u}_1$ $t_2$ to $t_3$; V1 and V2 nonconductive secondary: E; primary $u = E \cdot \ddot{u}_2$ $t_3$ on; V2 conductive secondary: E; primary $u = E \cdot \ddot{u}_1$ ("$u$" is the instantaneous magnitude of the voltage.)

The interval of time from $t_0$ to $t_2$ corresponds to the duration T of the switchover frequency at the primary side to the transmitter. The length of time $t_0$ to $t_1$ represents the switching delay T2 for the controllable tubes V1 and V2 respectively at the secondary side. Depending on the magnitude of the adjustable ignition delay T2, it is possible to adjust to any desired mean value in the range.

$$\ddot{u}_1 \cdot E < U < \ddot{u}_2 \cdot E$$

Referring to FIGS. 2b and 2c, the voltage $u_D$ applied at the choke D varies, as shown, in accordance with the formula $\ddot{u}_D = U - \ddot{u}$ while the current $i_D$ varies, as shown, in accordance with the formula $I = I_D$. In addition, the current fluctuates with amplitudes $\Delta i$ about the mean value $I = I_D$.

Referring to FIG. 2d, during the first switching period, i.e. from $t_0$ to $t_2$, the current $i_{11}$ on the primary side with switch S1 closed and switch S2 open varies according to the solid line, as shown, while during the next switching period from $t_2$ on the current $i_{12}$ on the primary side with switch S1 open and switch S2 closed varies according to the dotted line, as shown.

Referring to FIG. 2e, the current pattern for the current $i_2$ on the secondary side which is supplied over the rectifying circuit G to the consumer B is varied by the switchover processes produced by the tubes V1, V2 as follows:

for the time interval $t_0$ to $t_{1\,1}$, the current $i_2$ fluctuates between $(I + \frac{1}{2} \Delta i) \cdot \ddot{u}_2$ and $(I - \frac{1}{2} \Delta i) \cdot \ddot{u}_2$ for the time interval $t_1$ to $t_2$, the current $i_2$ fluctuates between $(I-i/2\,\Delta i)\cdot \ddot{u}_1$ and $(I+\frac{1}{2}\Delta i)\cdot \ddot{u}_1$.

Referring to FIG. 2f, the current pattern for the secondary current $i_{2'}$ flowing through the tubes V1, V2 appears only in the interval of times between $t_1$ and $t_2$ or after $t_3$ and fluctuates from $(I-1/2\,\Delta i)\cdot \ddot{u}_1$ to $(I+1/2\,\Delta i)\cdot \ddot{u}_1$.

Referring to FIG. 3, wherein like reference characters as above have been used to designate like parts, the converter can alternatively be constructed with a circuit having a transformer $T_r$ with a primary side having a middle tap, as above, and two part windings w1 and with a secondary side also having a middle tap connected to a supply line b of the consumer B and two symmetrically disposed part windings w2. The ends of the part windings w2 connect at common points to supplementary windings w2' and over respective rectifiers G1, G2, to the other supply line a of the consumer B. The free ends of the supplementary windings w2' are also connected over controllable tubes V1, V2, as above, to the supply line a of the consumer B.

The operation of the converter is similar to that described above and need not be further described. The controllable tubes V1, V2 receive their time delay relative to the switchover point at the primary side through the control device R.

In order to vary the transformation ratio, either the time delay of the switching on of the tubes V1, V2 can be altered the time delay can be made constant with respect to a variable switching time period on the primary side.

For example, referring to FIGS. 4 and 4b, the frequency f of the frequency generator F can remain constant over a constant time period T between the switchover instants on the primary side as the time delay on the secondary side instead of being constant (T2) is varied (T2'), for example, by being increased from T2 to T2'.

Alternatively, referring to FIGS. 5a and 5b, the time delay T2 can be fixed in the control device R in known manner while the control frequency f is varied by changing the switchover points T' on the primary side so that the constant time period T (FIG. 5a) is varied, as by being increased, to a new time period T' (FIG. 5b) by changing the control frequency f.

The advantage of utilizing a variable time delay T2' (FIG. 4b) allows, among other things, the switching frequency to be kept constant Thus, under certain conditions, the small harmonic content will be constant and can be compensated from the outset of operation.

It is noted that the primary side of the converters of the invention can be made self-heterodyning of the usual known manners. In such cases, the automatically self-adjusting switch-over point at the primary side is announced or emitted to the control device R so that the optional time delay for the switching of the controllable tubes on the secondary side can be effected.

What is claimed is:

1. A direct-current converter comprising
   a transformer having a primary winding and a secondary winding,
   first means connected to said primary winding for selectively directing direct current through said winding in one or the other of two opposite directions,
   second means connected to said secondary winding for rectifying the current therein, said second means including a pair of conductors for supplying the rectified current to a consumer,
   a supplementary winding connected to said secondary winding,
   a pair of lines connected to one end of said supplementary winding, each said line being connected to one of said conductors respectively,
   a pair of oppositely poled controllable tubes, each tube being disposed in a respective one of said lines, and
   means connected to said tubes and said first means for switching said tubes into one of a conductive or blocking state in response to the switching of direct-current between said two opposite directions in said primary winding.

2. A direct-current converter as set forth in claim 1 wherein said means for switching operates with a time delay in response to the switching of the direct-current in said primary winding.

3. A direct-current converter as set forth in claim 1 wherein said means for switching operates with a constant time delay and said first means operates with a variable switching frequency.

4. A direct-current converter as set forth in claim 1 wherein each said tube is a thyristor.

5. A direct-current converter as set forth in claim 1 wherein said first means for directing the direct current through said primary winding includes a middle tap connected to said primary winding, a pair of lines connected to the ends of said primary winding and a pair of switches, each switch being disposed in one of said lines to operate in simultaneous opposition to the other of said switches.

6. A direct-current converter as set forth in claim 5 wherein each switch is an electronic switch.

* * * * *

UNITED STATES PATENT OFFICE
CERTIFICATE OF CORRECTION

Patent No. 3,622,866　　　　　　　Dated November 23, 1971

Inventor(s)　　Andreas Boehringer

It is certified that error appears in the above-identified patent and that said Letters Patent are hereby corrected as shown below:

Column 1, line 60, cancel "very greatly" and insert --vary relatively--

Column 3, line 49, "switch" should be --switches--

Column 4, line 28, delete "where", second occurrence

Column 4, line 74, "$t_{1\,1}$" should be --$t_1$--

Column 5, line 27, after "altered" insert --with respect to a constant switching time period on the primary side or--

Signed and sealed this 16th day of May 1972.

(SEAL)
Attest:

EDWARD M. FLETCHER, JR.　　　　　ROBERT GOTTSCHALK
Attesting Officer　　　　　　　　Commissioner of Patents